(12) United States Patent
Araki et al.

(10) Patent No.: US 7,533,395 B2
(45) Date of Patent: May 12, 2009

(54) DISK APPARATUS

(75) Inventors: Yukihiro Araki, Fujiidera (JP); Shingo Kage, Kobe (JP); Shinya Ogasawara, Yokohama (JP); Nobuyuki Miroku, Ikoma (JP)

(73) Assignee: Panasonic Corporation, Osaka (JP)

( * ) Notice: Subject to any disclaimer, the term of this patent is extended or adjusted under 35 U.S.C. 154(b) by 348 days.

(21) Appl. No.: 10/576,378

(22) PCT Filed: Oct. 18, 2004

(86) PCT No.: PCT/JP2004/015380
§ 371 (c)(1),
(2), (4) Date: Apr. 19, 2006

(87) PCT Pub. No.: WO2005/038793
PCT Pub. Date: Apr. 28, 2005

(65) Prior Publication Data
US 2007/0079310 A1    Apr. 5, 2007

(30) Foreign Application Priority Data
Oct. 20, 2003    (JP)    ............................. 2003-359779

(51) Int. Cl.
*G11B 17/28*    (2006.01)
(52) U.S. Cl. ...................................... 720/712
(58) Field of Classification Search ............. 720/712, 720/604, 652, 705; 360/98.08, 99.05, 99.06, 360/99.12; 342/70; 369/75.11
See application file for complete search history.

(56) References Cited
U.S. PATENT DOCUMENTS

| | | | | |
|---|---|---|---|---|
| 4,737,948 A | * | 4/1988 | Okita | ......................... 720/712 |
| 4,786,997 A | * | 11/1988 | Funabashi et al. | ............ 720/705 |
| 4,799,209 A | * | 1/1989 | Grobben | ..................... 720/604 |
| 5,006,945 A | * | 4/1991 | Furusawa | ................ 360/99.12 |
| 5,583,717 A | * | 12/1996 | Nakata et al. | ............. 360/99.06 |
| 5,610,900 A | * | 3/1997 | Yamashita et al. | .......... 720/705 |
| 5,731,779 A | * | 3/1998 | Kikuchi | ........................ 342/70 |
| 5,959,959 A | | 9/1999 | Watanabe | |
| 6,243,346 B1 | * | 6/2001 | Furukawa et al. | ............ 720/652 |
| 6,392,980 B1 | * | 5/2002 | Sato et al. | .................... 720/604 |
| 6,477,121 B1 | | 11/2002 | Sato et al. | |
| 6,983,474 B2 | | 1/2006 | Shisido | |

FOREIGN PATENT DOCUMENTS

| | | |
|---|---|---|
| CN | 2529350 Y | 1/2003 |
| EP | 1302943 | 4/2003 |

(Continued)

*Primary Examiner*—Tianjie Chen
(74) *Attorney, Agent, or Firm*—Harness, Dickey & Pierce, PLC

(57) ABSTRACT

There is provided a disc device achieving a reduced thickness by reducing as much as possible the space required for sandwiching operation by a turn table and a clamper while assuring the space where an inserted disc is conveyed inside the device. The disc device includes: a clamper unit having a clamper for sandwiching a disc-shaped recording medium by a floating unit held via an elastic member to a fixed frame; and a disc recording/reproduction drive unit having a turn table. The disc device is configured so that when the disc-shaped recording medium is sandwiched, a part of the clamper and a part of the turn table are contained in each other.

4 Claims, 12 Drawing Sheets

FOREIGN PATENT DOCUMENTS

| | | |
|---|---|---|
| EP | 1486968 | 12/2004 |
| JP | 61-3547 | 1/1986 |
| JP | 62-150751 | 9/1987 |
| JP | 2-39343 U | 3/1990 |
| JP | 2-140658 U | 11/1990 |
| JP | 09-017081 | 1/1997 |
| JP | 10-208345 A | 8/1998 |
| JP | 11031350 | 2/1999 |
| JP | 2002288907 | 10/2002 |
| JP | 2003-77197 A | 3/2003 |
| JP | 2003-173597 A | 6/2003 |
| WO | 02/080165 | 10/2002 |

\* cited by examiner

DISK APPARATUS

TECHNICAL FIELD

The present invention relates to a disk apparatus which records and/or reproduces data on or from a disk-shaped recording medium such as CD, DVD or the like, and in particular, to a disk clamp mechanism for a disk-shaped recording medium for use in a disk apparatus.

BACKGROUND OF THE INVENTION

Recently, most of vehicles are equipped with disk apparatuses which record and/or reproduce data on or from disk-shaped recording media (hereinafter referred to as disks) such as CD, DVD, etc. In a disk apparatus of this type, the chassis having the turn table and the spindle motor mounted thereon has a floating structure that the chassis is supported by elastic means so as not to permit external vibrations to transmit to the turn table having a disk placed thereon. Such a floating chassis is provided with a disk clamp mechanism which makes it sure to reliably place a disk on the turn table (cf. Patent Literature 1).

The disk clamp mechanism in this disk apparatus causes the damper to press down the disk onto the turn table so as to hold the disk between the damper and the turn table.

Hereinafter, one of the conventional disk apparatuses is described with reference to the accompanying drawings.

FIGS. 11 and 12 shows the side views of a conventional disk apparatus, illustrating the operations of the essential internal mechanism thereof. FIG. 11 shows the disk apparatus in which a disk is being loaded, and FIG. 12 shows the disk apparatus in which the recorded data is being reproduced from the disk held between the damper and the turn table.

With reference to FIG. 11, the disk 101 to be loaded on the disk apparatus is led by the disk guide 102 and the guide roll 103, and carried to the turn table 104 located within the disk apparatus. The damper 105 is located above the turn table 104, namely, at a position away from the turn table 104, and in contact with the damper stopper 113. The damper 105 is supported by the shaft portion of the floating chassis 107 through the damper arm 106, and is always urged toward the turn table 104 by urging means 108 provided on the shaft portion of the chassis 107. The engaging portion 109 formed with the damper arm 106 is caused to come into contact with the clamper-driving member 110 so that the damper 105 can move away from the turn table 104. When the disk 101 is inserted and carried to the turn table 104, the clamper-driving member 110 is moved and disengaged from the engaging portion 109. Then, the clamper 105 is caused to press down the turn table 104 through the disk 101 by the driving force from the urging means.

FIG. 12 shows the disk 101 held between the damper 105 and the turn table 104. The disk 101 held between the damper 105 and the turn table 104 is rotated by the spindle motor 111 so that data is recorded on or reproduced from the disk 101 by the optical head 112.

Patent Literature 1: the publication of JP-A-09-17081

DISCLOSURE OF THE INVENTION

Problems to be Solved by the Invention

In the conventional disk apparatus arranged as above, the clamper 105 is floatably engaged with the damper arm 106, and the inserted disk is reliably held down by the damper 105 on the turn table. In the disk apparatus of this type, the damper 105 is located relatively distant from the turn table 104 while the disk is being carried, in consideration of the variability of the length of the clamp arm 106 from the point of application and the oscillation of the damper 105 in a floating state. In the field of disk apparatuses, one of the important problems is therefore to reduce the distance between the damper 105 and the turn table as much as possible while the disk is being carried inside the disk apparatus, to thereby reduce the thickness of the disk apparatus.

The present invention is intended to solve this problem, and an object of the present invention is to provide a disk apparatus including an inexpensive and thin clamp mechanism which is attained by reducing a space required for holding a disk between the turn table and the damper as much as possible while ensuring a space where the disk inserted can be reliably carried within the disk apparatus.

Means for Solving Problems

A disk apparatus according to the present invention comprises, as described in claim 1, a stationary frame, and a floating unit which is disposed in the stationary frame through elastic means and which performs recording and/or reproducing on a disk-shaped recording medium, wherein the floating unit includes a clamping member having a damper for holding the disk-shaped recording medium and a disk recording/reproducing-driving unit having a turn table, and wherein a part of the clamping member and a part of the turn table are fitted in each other, when the disk-shaped recording medium is held between the damper and the turn table. The disk apparatus of the present invention, thus arranged, makes it possible to practically reduce the space required for holding the disk-shaped recording medium between the turn table and the clamper, while ensuring the space for reliably carrying the inserted disk-shaped recording medium within the disk apparatus.

Another disk apparatus according to the present invention is characterized in that, as described in claim 2, the clamping member of the disk apparatus defined in claim 1 comprises a damper base rotatably combined to the chassis of the floating unit, a clamper-holding part combined or integrated to the clamber base through a clamp arm made of an elastic material, and a damper rotatably engaged with the clamper-holding part at and around the center of rotation of the disk-shaped recording medium. The disk apparatus of the present invention, configured as described above, makes it possible to engage the damper with the clamper-holding part in a smaller clearance to thereby reduce the space required for holding the disk-shaped recording medium between the turn table and the clamper.

A further disk apparatus according to the present invention is characterized in that, as described in claim 3, a claw of the clamper-holding part is engaged with a hook of the damper inside the internal position of the center hole of the disk-shaped recording medium loaded on the disk apparatus defined in claim 1, while the damper at the engaging position is being fitted in the shaft portion of the turn table. The disk apparatus of the present invention, configured as described above, makes it possible to reduce the clearance for the engagement of a claw of the clamper-holding part with a hook of the damper to thereby reduce the space required for holding the disk-shaped recording medium between the turn table and the clamper.

A still further disk apparatus according to the present invention characterized in that, as described in claim 4, the hook portion is formed at the center portion of the damper of the disk apparatus defined in claim 2, and in that the hook portion comprises a plurality of hooks formed at regular intervals on the same circumference, and a projection which is formed above the center axis of rotation of the disk-shaped recording medium and which comes into contact with the clamper-holding part when the disk-shaped recording medium is held between the turn table and the clamper. The disk apparatus of the present invention, configured as described above, makes it sure to reduce the space required for holding the disk-shaped recording medium between the turn table and the clamper, and makes it sure to rotatably engage the damper with the clamper-holding part.

A still further disk apparatus according to the present invention is characterized in that, as described in claim 5, the turn table of the disk apparatus defined in claim 3 has a shaft portion for positioning the disk-shaped recording medium; in that the shaft portion has an annular groove formed at its part corresponding to a position at which a claw of the clamper-holding part is engaged with a hook of the clamper; and in that a part of the damper is fitted in the annular groove when the disk-shaped recording medium is held between the turn table and the clamper. The disk apparatus of the present invention, configured as described above, makes it possible to reduce the space occupied by the turn table and the damper when the disk-shaped recording medium is held therebetween, and thus makes it possible to reduce the thickness of the clamp mechanism of the disk apparatus.

Effect of the Invention

According to the present invention, a part of the damper and a part of the turn table are fitted in each other when the disk is held between the damper and the turn table, and therefore, the space required for holding the disk between the turn table and the damper is reduced as much as possible, while the space where the disk is reliably carried is being ensured. Thus, it becomes possible to reduce the thickness of a whole of the disk apparatus.

According to the present invention, the loading of the disk on the turn table is reliably performed, and the engagement of the damper with the clamper-holding part is made at and around the center of rotation of the disk, to thereby make it possible to carry out this engagement in a smaller clearance. Therefore, it becomes possible to provide the thin disk apparatus equipped with a thinner and inexpensive clamp mechanism.

DESCRIPTION OF REFERENCE NUMERALS

1=an upper frame
2=a disk guide
3=a clamping member
4=a disk-carrying member
5=a disk carriage-driving member
6=a traverse chassis
7=a disk recording/reproducing-driving member
8=a printed board
9=a lower frame
10=a floating unit
11=a disk insertion/extraction port
101=a disk

BEST MODES FOR CARRYING OUT THE INVENTION

Hereinafter, preferred embodiments of a disk apparatus according to the present invention will be described with reference to the accompanying drawings.

First Embodiment

Figure 1:
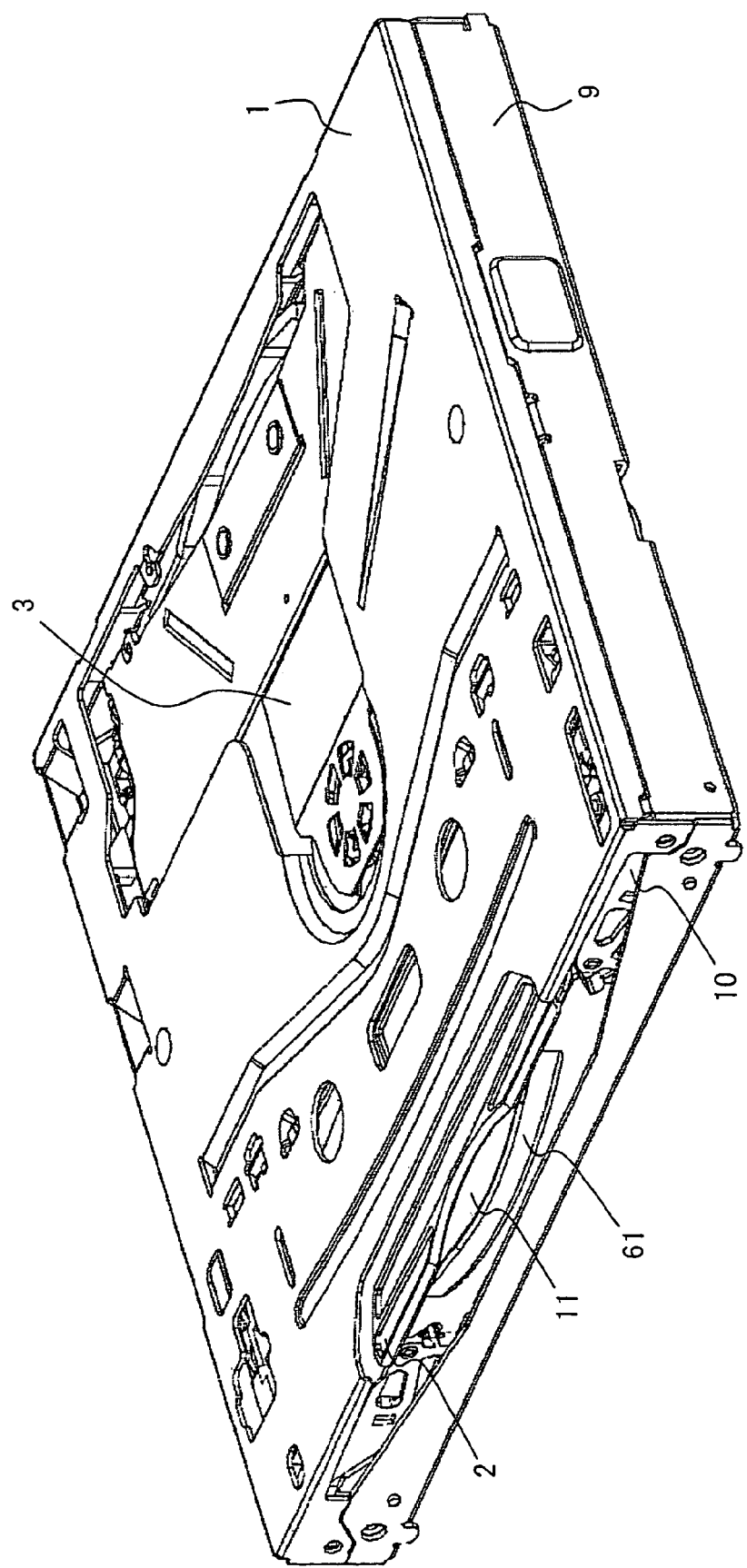
FIG. 1 shows a perspective view of a disk apparatus without an outer casing, according to the first embodiment of the present invention.
Figure 2:
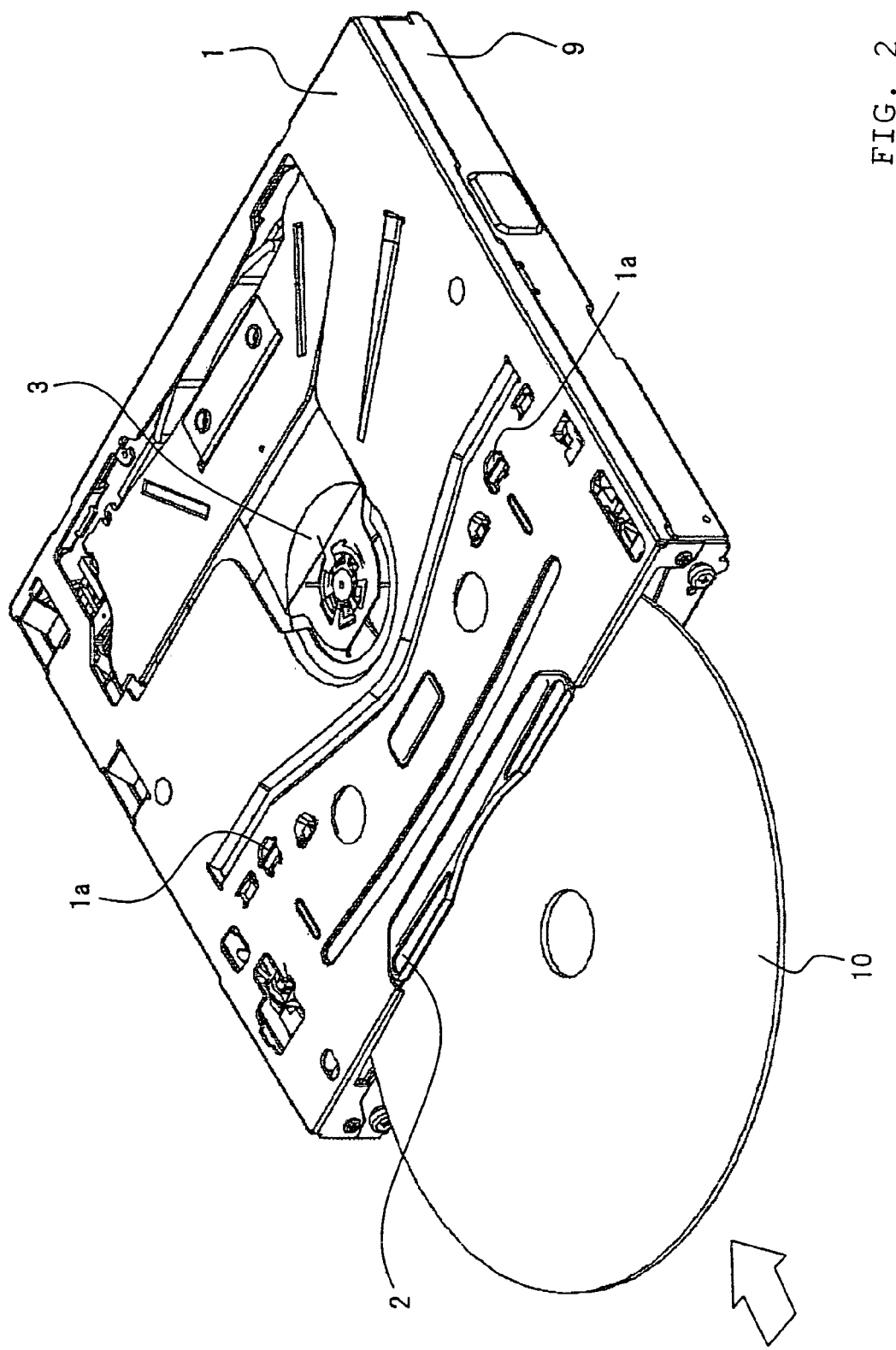
FIG. 2 shows a perspective view of the disk apparatus shown in FIG. 1, into which a disk-shaped recording medium is being inserted.
Figure 3:
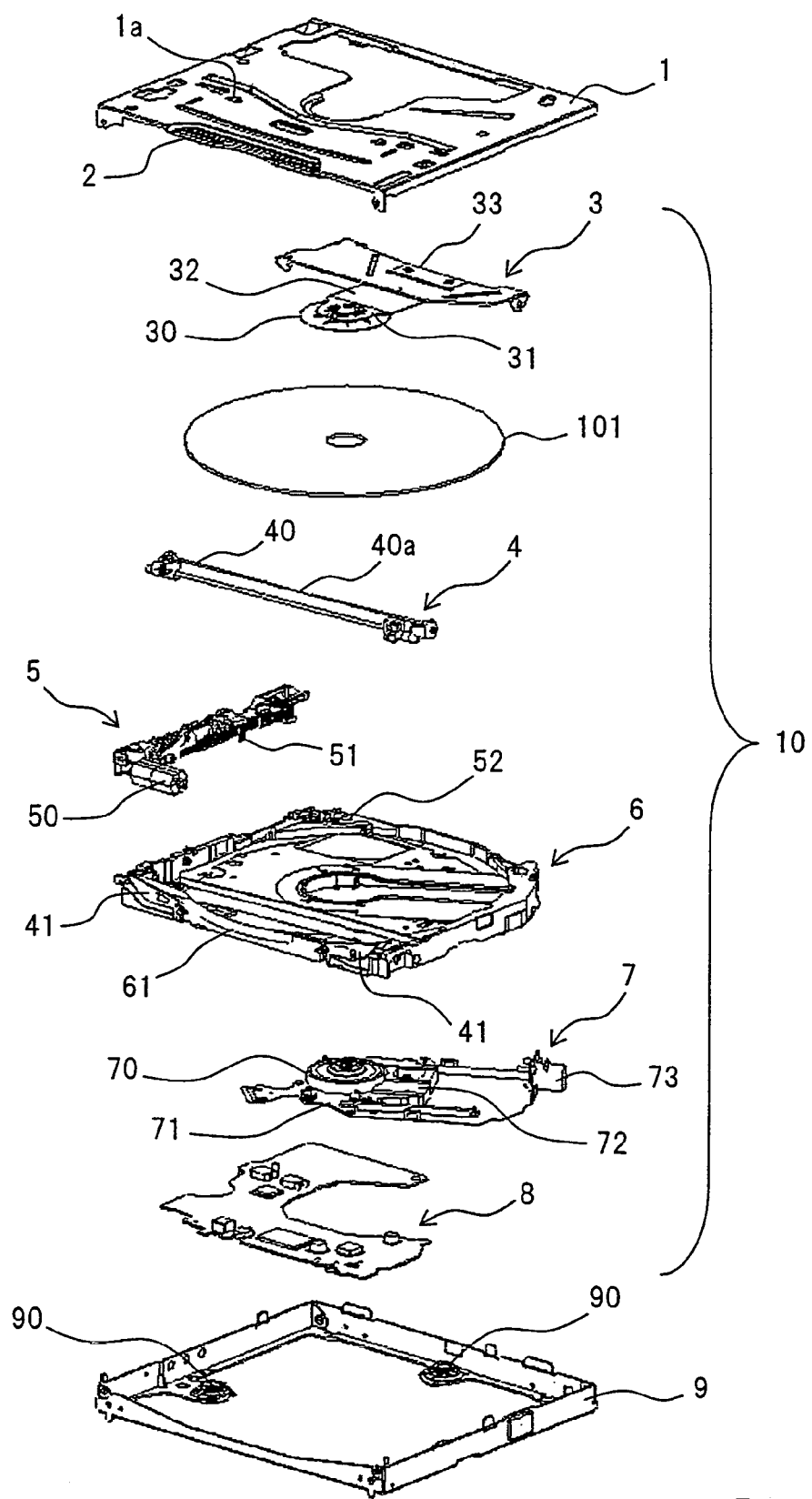
FIG. 3 shows an exploded perspective view of the disk apparatus shown in FIG. 1, illustrating the internal mechanism thereof.

FIG. 1 shows a perspective view of a disk apparatus without an outer casing, according to the first embodiment of the present invention. FIG. 2 shows a perspective view of the disk apparatus shown in FIG. 1, into which a disk-shaped recording medium, i.e., a disk, is inserted. FIG. 3 shows an exploded perspective view of the disk apparatus shown in FIG. 1, illustrating the internal mechanism thereof.

The disk apparatus according to the first embodiment shown in FIGS. 1 to 3 has a function to perform recording and reproducing on the disk 101 such as CD, DVD or the like. The disk 101 is inserted in its diameter direction and loaded on the disk apparatus, to perform recording or reproducing on the disk 101.

The disk apparatus of the first embodiment comprises an upper frame 1 and a lower frame 9 which are fixed to the outer casing, and a floating unit 10 which are elastically supported by a plurality of damper springs 90 made of an elastic material.

As shown in FIG. 3, the floating unit 10 comprises a clamping member 3 which tightly presses down an inserted disk 101 onto a turn table 70 and holds the disk 101 between itself and the turn table 70; a disk-carrying member 4 which carries the disk 101; a disk carriage-driving member 5 which includes a driving source, etc. for the disk-carrying member 4; a traverse chassis 6 which locates the disk 101 at a recording/reproducing position; a disk recording/reproducing-driving member 7 which drives the disk 101 to rotate so as to record data on or reproduce the data from the disk 101; and a printed board 8 which is disposed on a rear face (the reverse of the face for disposing the disk) of the traverse chassis 6 and which has electric circuits for controlling the driving of the respective mechanisms of the floating unit 10.

The floating unit 10 thus arranged is elastically supported in a floating state by the plurality of the electrically insulating damper springs 90 fixed on the lower frame 9.

Figure 4:
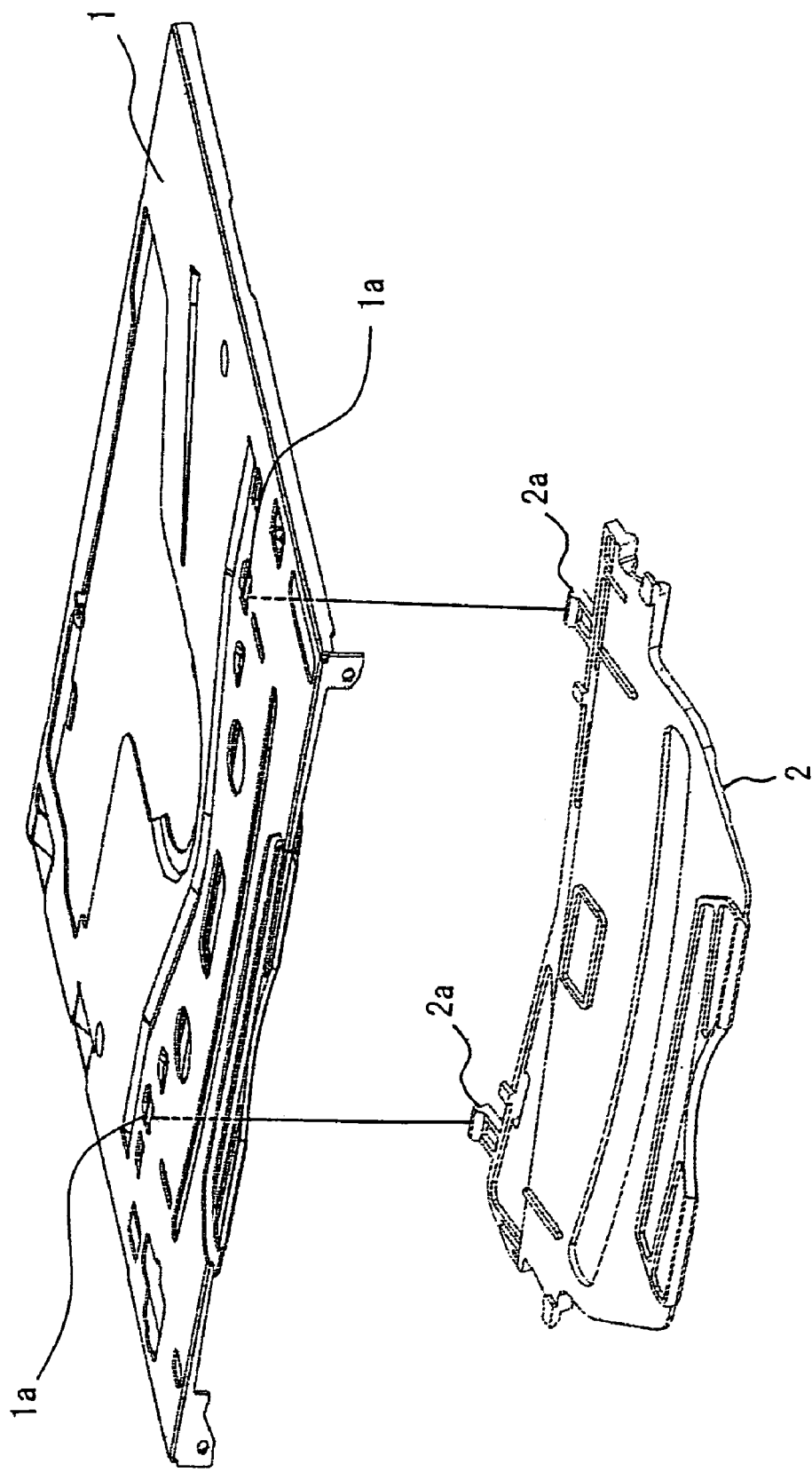
FIG. 4 shows an exploded perspective view of the upper frame 1 of the disk apparatus according to the first embodiment.

FIG. 4 shows the exploded perspective view of the upper frame 1. As shown in FIG. 4, a disk guide 2 is rotatably held in suspension at two points from the reverse of the upper frame 1. The two projections 2a, 2a of the disk guide 2 are fitted in and engaged with the holes 1a, 1a formed in the upper frame 1, so that the disk guide 2 can be rotated a predetermined angle centering on the two engaged parts, relative to the upper frame 1, on the side of the front of the disk apparatus.

Figure 5:
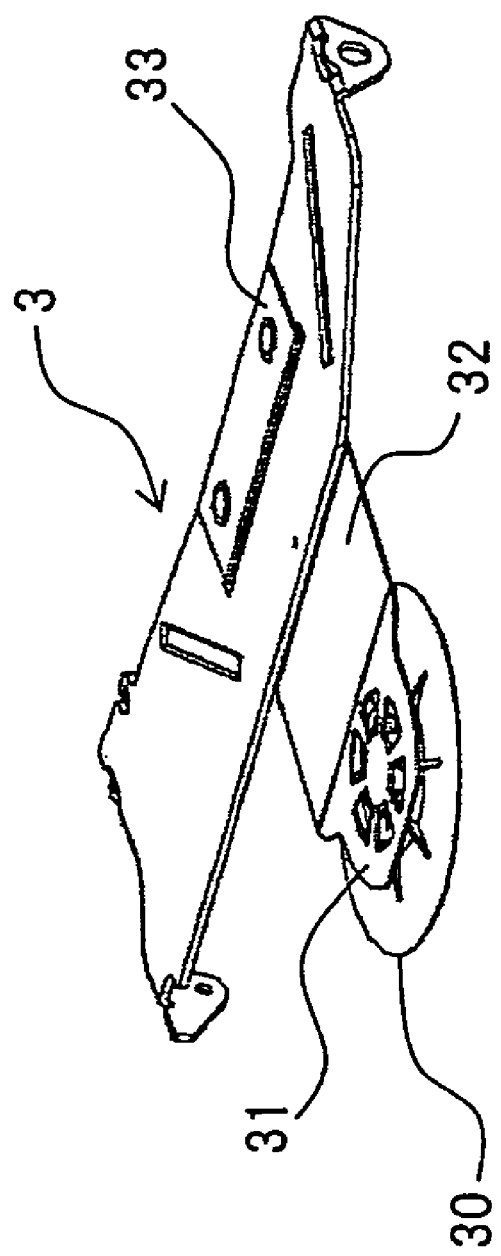
FIG. 5 shows a perspective view of the clamping member 3 of the disk apparatus according to the first embodiment.

FIG. 5 shows a perspective view of the clamping member 3. As shown in FIG. 5, the clamping member 3 comprises a damper 30 which is used to press down the inserted disk 101, a clamper-holding part 31 which floatably holds the damper 30, and a damper base 33 which rotatably connects the clamper-holding part 31 to the traverse chassis 6 through a damper arm 32. The damper arm 32 which mechanically connects the damper base 33 to the clamper-holding part 31 is made of an elastic material such as a thin metal sheet, and regulates the pressure of the damper 30 for holding down the disk. The damper 30 is held by the clamper-holding part 31 while being rotatably engaged with the clamper-holding part 31.

The clamping member 3 thus arranged is located above the turn table 70, i.e., at a position away from the turn table 70 and in contact with the upper frame 1, when the disk 101 is inserted and carried inside the disk apparatus. In the clamping member 3, the damper base 33 is mounted around the shaft of the traverse chassis 6 of the floating unit 10, and the damper 30 is rotated centering on the shaft by urging means (not shown) provided on the damper base 33, such as a spring, a clank mechanism or a cam mechanism. When the disk 101 is not at a recording/reproducing position, the damper 30 is placed in contact with the upper frame 1 by the urging means, and thus is located at the position away from the turn table 70. When the disk 101 is inserted and carried to the position (the recording/reproducing position) above the turn table 70, the urging means urges the damper 30 to press down the turn table 70 with the disk 101 held between the damper 30 and the turn table 70.

Figure 6:
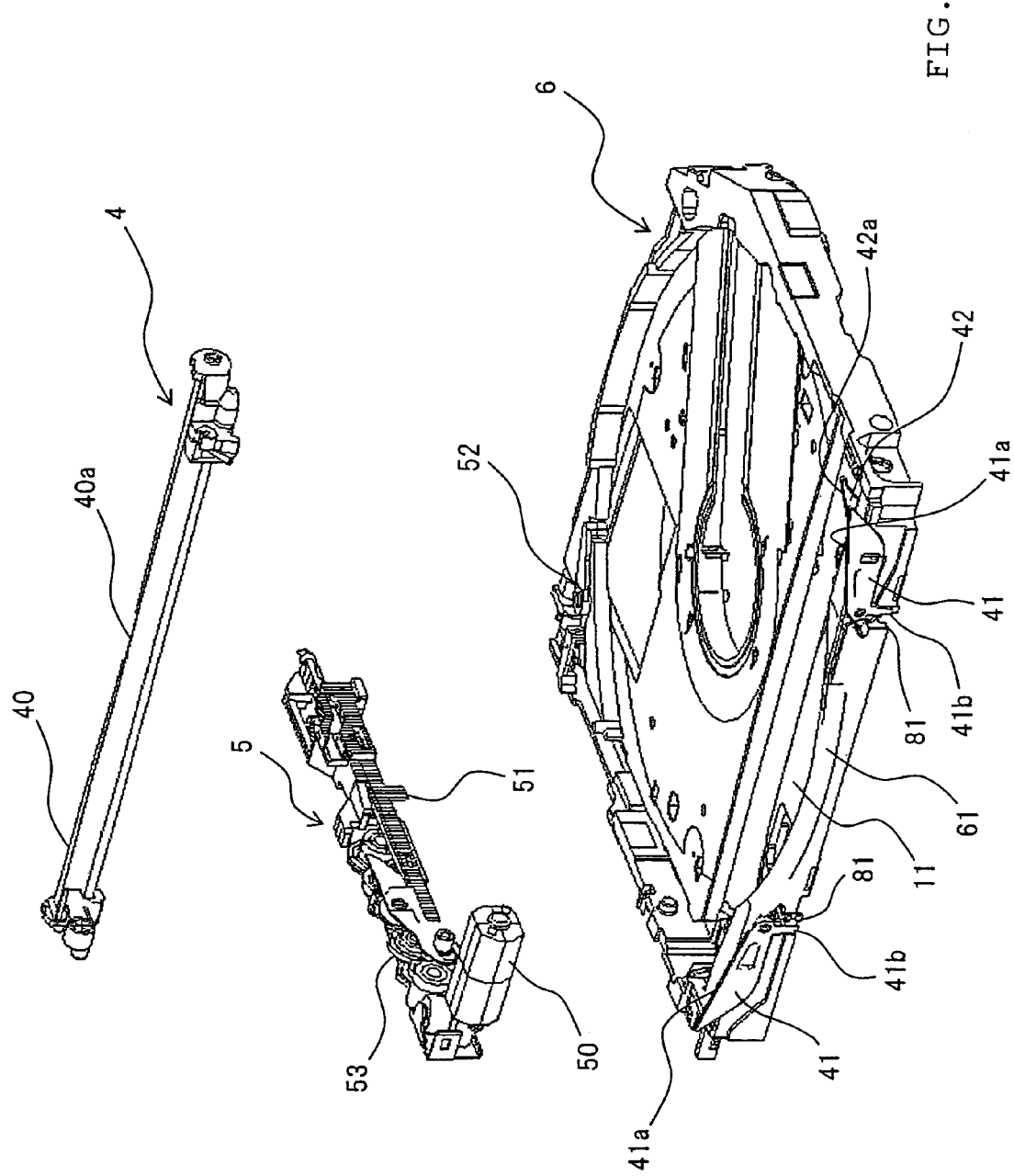
FIG. 6 shows perspective views of the disk-carrying member 4, the disk carriage-driving member 5 and the traverse chassis 6 of the floating unit 10 of the disk apparatus according to the first embodiment.

FIG. 6 shows the perspective views of the disk-carrying member 4, the disk carriage-driving member 5 and the traverse chassis 6 of the flowing unit 10 of the disk apparatus of the first embodiment.

The disk-carrying member 4 includes a roller arm 40 having a carriage roller 40a which rotates itself while pressing the disk 101 onto the disk guide 2, to thereby carry the disk 101. The carriage roller 40a of the roller arm 40 is usually pressed onto the disk guide 2 by the urging force from a spring, and the carriage roller 40a is moved downward (in a direction away from the disk guide 2) when the carriage of the disk is completed to locate the disk 101 at the recording/reproducing position.

In the disk apparatus of the first embodiment, the rotation shaft of the roller 40a is inclined a predetermined angle relative to the front of the disk apparatus at which a disk insertion/extraction port 11 is provided. This is because it is needed to obliquely carry the disk, since the disk apparatus is not arranged so that the locus of the motion of insertion or ejection of the disk 101 on the traverse chassis 6 can intersect orthogonal to a parallel line to the disk insertion/extraction port 11 of the disk apparatus, in other words, so that the disk 101 can move straightly in the fore and aft direction of the disk apparatus, when the disk apparatus is seen from just above. Therefore, the disk 101 inserted is carried inclining to the front of the disk apparatus at which the disk insertion/extraction port 11 is provided. In the first embodiment, the motor 50 of the disk carriage-driving member 5 is disposed in the proximity of the disk insertion/extraction port 11 of the front of the traverse chassis 6, and a part of the recording/reproducing position is located on the rear side of the motor 50. For this reason, the disk 101 is carried inclining from the disk insertion/extraction port 11, in the first embodiment.

The disk carriage-driving member 5 shown in FIG. 6 comprises the motor 50 which drives and rotates the carriage roller 40a of the roller arm 40 when the disk is carried (in the loading operation) in the disk apparatus; a control slider 51 which holds the traverse chassis 6 unmoved on the upper frame 1 before the insertion of the disk and after the completion of ejection of the disk (in the unloading operation); a trigger lever 52 which detects the reaching of the disk 101 to the recording/reproducing position after the completion of the carriage of the disk; and a gear array which transmits the rotation of the motor 50 to the control slider 51 or the like. While the trigger lever 52 is seen at a position on the rear side within the traverse chassis 6 in FIG. 6, one end of the trigger lever 52 is in contact with the rear end portion of the control slider 51, so that the control slider 51 is moved together with the motion of the trigger lever 52. The other end of the trigger lever 52 within the traverse chassis 6 is located at a position where the other end of the trigger lever 52 can contact the edge of the disk 101, when the disk 101 has reached the position above the recording/reproducing position.

The disk recording/reproducing driving member 7 and the printed board 8 are attached on the traverse chassis 6 which has the above disk-carrying member 4 and the above disk carriage-driving member 5 mounted thereon. Provided on the front of the traverse chassis 6 are disk detection levers 41 which are disposed in the front of the roller arm 40 so as to detect the insertion of the disk 101 into the disk apparatus, and a disk ejection detecting lever 42 which detects the ejection of the disk 101. The disk insertion detecting levers 41 and the disk ejection detecting lever 42 are usually urged upward by forces from springs, and thus are located at predetermined positions on the upper side, when the disk 101 is not inserted.

As shown in FIG. 6, the disk detection levers 41 are disposed at and around both sides of the disk insertion/extraction port 11, and are formed in the shapes of blades which spread to both sides and are raised at both ends. When the disk 101 is inserted into the disk insertion/extraction port 11, the outer edge of the disk 101 presses upward the detection faces 41a (the upper faces as seen in FIG. 6) of either or both of the disk detection levers 41 disposed at both sides of the disk insertion/extraction port 11, so that the projections 41b formed on the detection levers 41 press down a mechanical switch. When this mechanical switch is pressed down, the carriage roller 40a is started to rotate, and this rotation of the roller 40a carries the disk 101 to a predetermined position of the traverse chassis 6.

Figure 7:
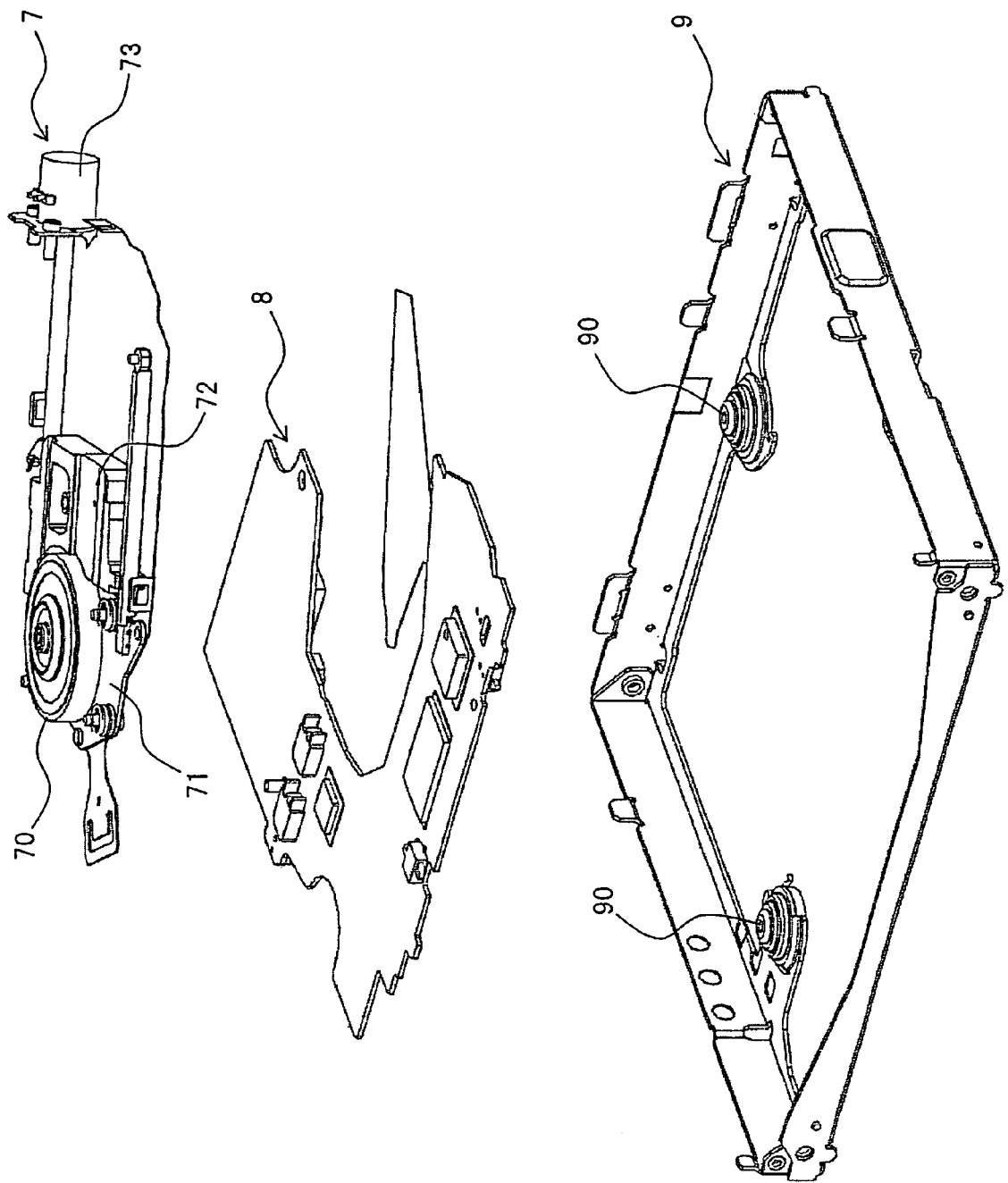
FIG. 7 shows an exploded perspective view of the disk apparatus according to the first embodiment, illustrating the disk recording/reproducing driving member 7, the printed board 8, and the lower frame 90 supporting the traverse chassis 6 through damper springs 90.

FIG. 7 shows an exploded perspective view of the disk apparatus, illustrating the disk recording/reproducing driving member 7, the printed board 8 and the lower frame 9. The lower frame 9 supports the floating unit 10 including the traverse chassis 6, etc. through damper springs 90. As shown in FIG. 7, the disk recording/reproducing driving member 7 includes the turn table 70 which is rotated with the disk 101 placed thereon, the spindle motor 71 for rotating the turn table 70, an optical pick member 72 which records data on or reproduce the data from the disk 101, and an optical pick driving motor 73 which drives the optical pick member 72 in the diameter direction of the disk 101. The printed board 8 is attached on the reverse of the traverse chassis 6, and has electric circuits formed thereon for controlling the driving of the respective mechanisms provided on the traverse chassis 6.

Before the insertion of the disk, the traverse chassis 6 is located at a lower position within the frame which comprises the upper frame 1 and the lower frame 9, because of the regulation by the control slider 51 and the pressing of the disk guide 2 by the roller arm 40. When the disk 101 is inserted in this state, the disk 101 is put in between the carriage roller 40a and the disk guide 2 and thus is carried to the recording/ reproducing position. When the disk 101 has reached the recording/reproducing position, the traverse chassis 6 is put in a floating state and is moved upward, while the disk 101 is held between the turn table 70 and the damper 30.

On the other hand, to eject the disk 101, the damper springs 90 are compressed by the pressing of the roller arm 40 to the disk guide 2 and by the operation of the control slider 51, so that the traverse chassis 5 is moved downward and located at the lower position in the stationary frame.

Next, the clamping member 3 of the disk apparatus according to the first embodiment is described in detail.

Figure 8:
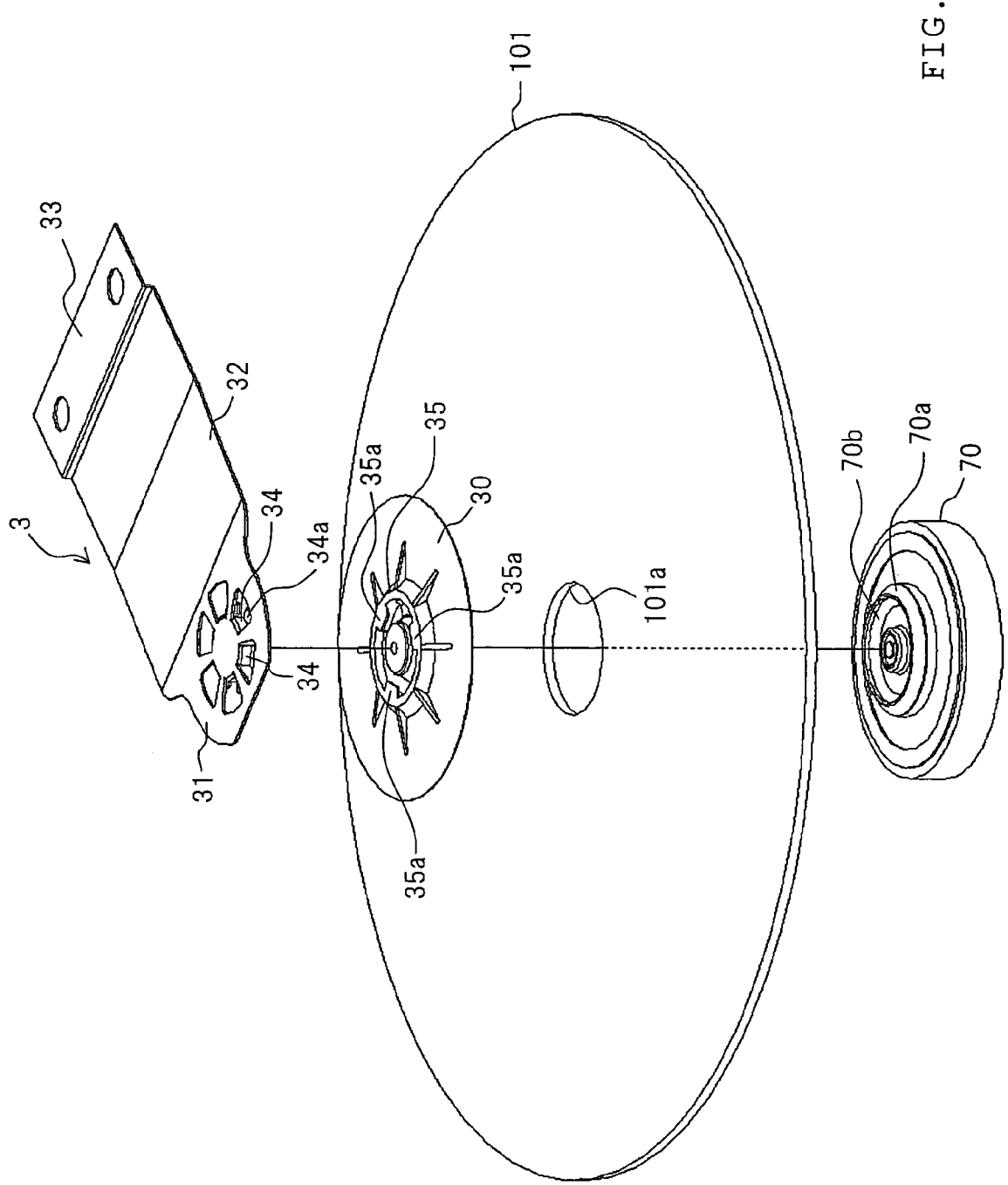
FIG. 8 shows an exploded perspective view of the first embodiment, illustrating the detailed structure of the clamping member 3.
Figure 9:
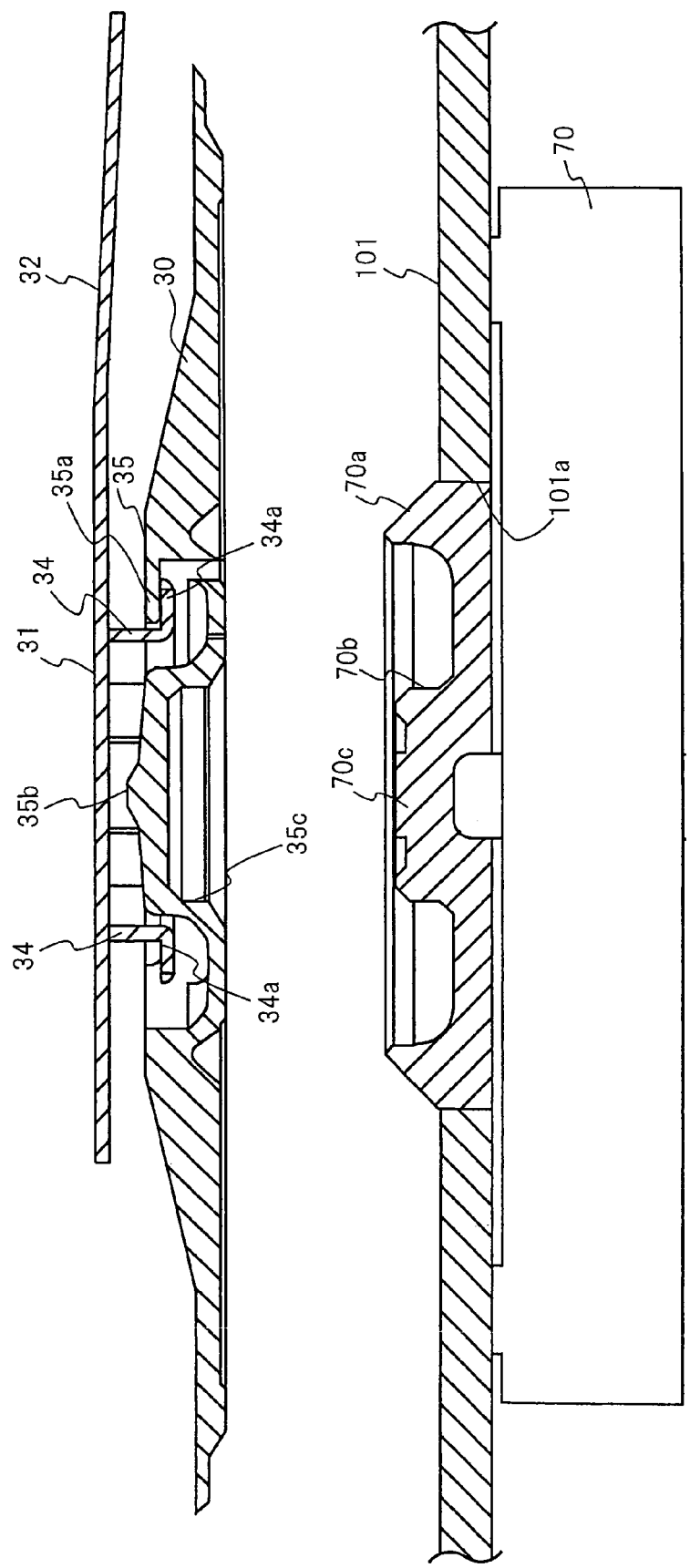
FIG. 9 shows a sectional view of the damper 30 engaged with the clamper-holding part 31 located above the turn table 70 in the first embodiment.
Figure 10:
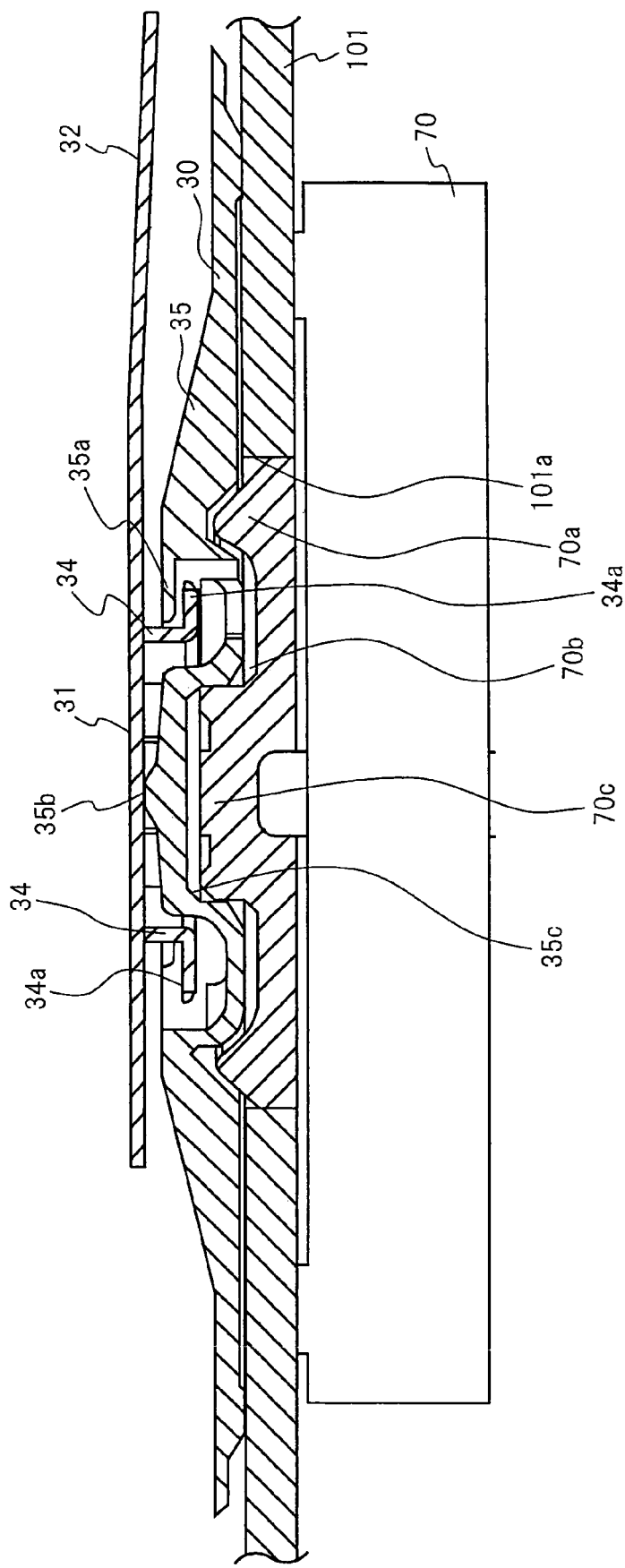
FIG. 10 shows a sectional view of the damper 30 which holds down the disk 101 onto the turn table 70 in the first embodiment.
Figure 11:
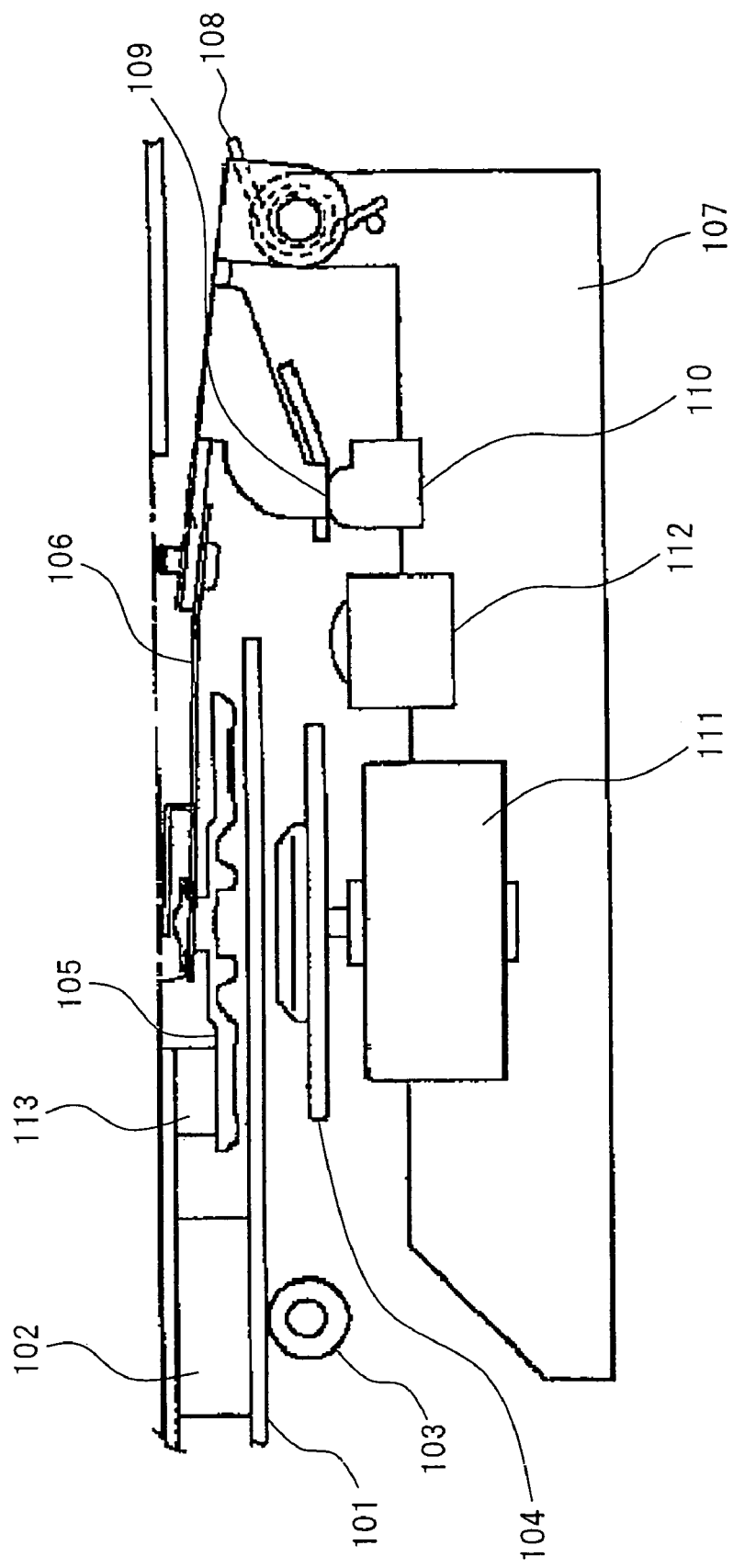
FIG. 11 shows a side elevation of a conventional disk apparatus, illustrating an operation of the essential internal mechanism thereof, for loading a disk-shaped recording medium on the disk apparatus.
Figure 12:
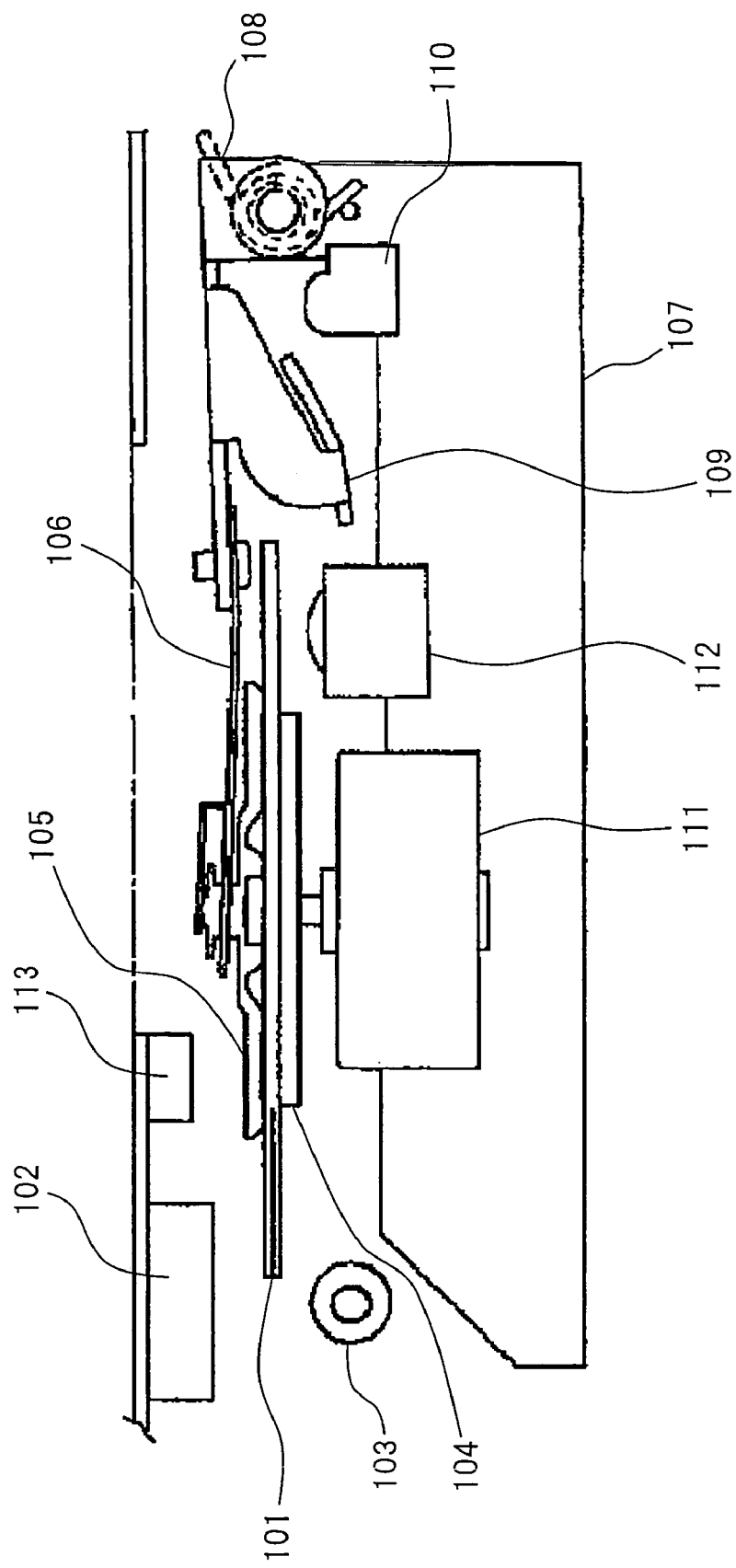
FIG. 12 shows a side elevation of the conventional disk apparatus, illustrating an operation of the essential internal mechanism thereof, for reproducing that data from the disk-shaped recording medium held between the clamper and the turn table.

FIG. 8 shows an exploded perspective view of the clamping member 3, illustrating the detailed structure thereof. As shown in FIG. 8, the clamping member 3 comprises the damper 30 and the clamper-holding part 31 as separate components. The hook portion 35 formed on the damper 30 is rotatably engaged with the claw portion 34 formed on the clamper-holding part 31. FIG. 9 shows a sectional view of the damper 30 which is engaged with the clamper-holding part 31 located above the turn table 70. FIG. 10 shows a sectional view of the damper 30 which holds down the disk 101 onto the turn table 70. As shown in FIGS. 9 and 10, the damper 30 has the hook portion 35 raised at its center portion. Hooks 35a are formed at and around the center of rotation of the hook portion 35. In the first embodiment, a plurality of the hooks 35a are formed projecting in the center axial direction of the rotation, and are disposed at regular angular intervals, surrounding the center axis of rotation. The undersides (or the reverses) of the hooks 35a of the hook portion 35 are fitted in an annular groove 70b formed in the shaft portion 70a of the turn table 70, when the disk is held between the damper and the turn table 70. A concavity 35c is formed at the lower side (or on the reverse) of the hook portion 35 at and around the center axis of rotation. A convexity 70c which forms the inner wall of the annular groove 70b of the shaft portion 70a of the turn table 70 is fitted in this concavity 35c, when the disk is held between the damper and the turn table. The shaft portion 70a is fitted in the positioning hole 101a of the disk 101 when the disk 101 is held between the damper and the turn table, and the outer upper portion of the shaft portion 70a is formed as a sloped face so as to facilitate the mounting of the disk 101.

As described above, in the first embodiment, a part of the hook portion 35 of the damper 30 and a part of the shaft portion 70a of the turn table 70 are fitted in each other when the disk is held between the damper and the turn table. Therefore, the distance between the damper 30 and the surface of the disk becomes shorter when the disk is held between the damper and the turn table, in other words, the disk apparatus can be assembled with a smaller thickness.

As shown in FIGS. 8 and 9, the claw portion 34 is formed by cutting the clamper-holding part 31 at and around the rotation center axis and bending the cut portions. The claw portion 34 is L-shaped, and the tip ends thereof are projected in the circumferential direction. The tip end portions of the claw portion 34 are formed as claws 34a capable of engaging with the hooks 35a of the hook portion 35 of the damper 30. When the clamping member 3 is moved upward and thus does not hold down the disk 101, the claws 34a of the clamper-holding part 31 are held upward floatably, engaging with the hooks 35a of the damper 30.

When the clamping member 3 as arranged above holds the disk 101 with the turn table, the reverse of the clamper-holding part 31 is in point contact with the top of the projection 35b formed at the center axis of rotation of the hook portion 35. When the clamping member 3 is rotated holding the disk 101, the damper 30 alone is pressed down by way of the point contact with less contact resistance, and thus is rotated together with the disk 101.

It is needed for the damper 30 to oscillate a certain angle in order to ensure the holding of the disk 101 when the disk 101 is inserted. In this regard, the "oscillation" means that the face of the damper 30 in contact with the disk is caused to oscillate relative to the recording face of the disk 101. The amplitude of the "oscillation" is determined by a clearance (or a space) formed when the claw 34a of the clamper-holding part 31 is engaged with the hook 35a of the damper 30.

As described above, the claw 34a of the clamper-holding part 31 is engaged with the hook 35a of the damper 30 at and around the center axis of rotation, and therefore, the "oscillation" of the damper 30 at a given angle can be ensured in a smaller clearance (or space) formed during the engagement of the claw 34a with the hook 35a. In the disk apparatus of the first embodiment, the claw 34a of the clamper-holding part 31 is engaged with the hook 35a of the damper 30 inside the positioning hole 101a of the disk 101 formed at the center thereof, i.e., at a position close to the center of rotation of the disk 101.

Therefore, in the disk apparatus of the first embodiment, the space required for holding the disk between the turn table 70 and the damper 30 can be reduced as much as possible, while ensuring the space for reliably carrying the disk 101. Further, the disk apparatus according to the first embodiment makes it sure to set the disk 101 on the turn table 70. Furthermore, according to the first embodiment, the engagement of the damper 30 with the clamper-holding part 31 can be executed within a smaller clearance, when the disk is loaded, and the amplitude of the "oscillation" of the damper 30 can be lessened, to thereby assemble the disk apparatus with a smaller thickness because of the thin and inexpensive clamp mechanism.

The operation of the disk apparatus according to the first embodiment is described below.

When the disk 101 is inserted into the disk apparatus of the first embodiment from the disk insertion/extraction port 11 thereof, the disk detection levers 41 are pressed down by the disk 101 to thereby detect the insertion of the disk 101. When the insertion of the disk 101 is detected, the carriage roller 40a of the roller arm 40 is caused to rotate holding the disk 101 onto the disk guide 2. As a result, the disk 101 is carried to the disk recording/reproducing position within the disk apparatus. At this stage, the control slider 51 of the disk carriage-driving member 5 comes into contact with the upper frame 1 to thereby limit the movement of the traverse chassis 6.

In the disk apparatus of the first embodiment, the roller arm 40 is attached to the disk insertion/extraction port 11, i.e., the front of the disk apparatus, inclining thereto, and therefore, the disk 101 is obliquely inserted into the disk apparatus, at the front of the disk apparatus. This is because the motor 50 is disposed at the left side relative to the disk insertion/extraction port 11 of the disk apparatus as shown in FIG. 6, and because a part of the disk recording/reproducing position is located at the rear side of the motor 50. Thus arranged, the respective mechanisms are efficiently disposed and organized on the traverse chassis 6.

When the disk 101 has reached the disk recording/reproducing position, the trigger lever 52 contacts the disk 101, so that the roller arm 40 stops its rotation and moves downward to the disk. This downward motion of the roller arm 40 to the disk also moves down the disk guide 2 in contact with the carriage roller 40a. Since the disk guide 2 is held in suspension from the upper frame 1, the disk guide 2 rotates centering on its engaging positions, and clogs a part of the disk insertion/extraction port 11 to thereby inhibit the insertion of another disk. In addition, the trigger lever 52 comes into contact with the disk 101 to thereby move the control slider 51 in a direction opposite to the inserting direction of the disk 101. When the control slider 51 is moved in this way, the control slider 51 is away from the upper frame 1, so that the traverse chassis 6 is elastically supported by the damper springs 90, namely, the floating unit 10 is put into a floating state. In this floating state, the damper 30 of the clamping member 3 is pressed down to thereby hold the disk 101 together with the turn table 70 at the disk recording/reproducing position.

When the disk 101 is completely held between the damper 30 and the turn table 70, the disk 101 is rotated, and the optical pick member 72 is simultaneously moved to perform recording or reproducing on the disk 101.

For example, when an instruction to eject the disk is inputted from an external unit after the completion of the recording or reproducing on the disk 101, the control slider 51 of the disk carriage-driving member 5 is moved to bring up the roller arm 40, so that the disk 101 is pressed onto the disk guide 2 of the upper frame 1. Then, the control slider 51 comes into contact with the upper frame 1 to thereby limit the motion of the traverse chassis 6. At this stage, the disk guide 2 is brought upward to open the disk insertion/extraction port 11.

The carriage roller 40a of the roller arm 40 is rotated in this state to eject the disk 101 from the disk insertion/extraction port 11. The ejection of the disk 101 is detected by the disk ejection detecting lever 42 provided on the traverse chassis 6. The disk ejection detecting lever 42 is shaped in the form of a blade which is bent upward at its end, as well as the disk detecting levers 41 disposed at and around both ends of the disk insertion/extraction port 11. While the disk 101 is being ejected from the disk insertion/extraction port 11, the outer edge of the disk 101 presses down the detecting face 42a (the upper face shown in FIG. 6) of the disk ejection detecting lever 42. When the disk 101 has been completely ejected from the disk insertion/extraction port 11, the end portion of the disk ejection detecting lever 42 is brought upward to thereby detect the completion of the ejection of the disk 101. When the disk 101 has been completely ejected, the roller arm 40 stops rotating and is moved upward by the force from the spring and is stopped by the disk guide 2 and the lower frame 9. Then, the ejection of the disk 101 is completed.

While the above embodiment has been described as the disk apparatus capable of both recording and reproducing, the present invention can be applied to not only the disk apparatus of this type, but also other disk apparatuses such as recording apparatuses and reproducing apparatuses for disk-shaped recording media.

INDUSTRIAL APPLICABILITY

The present invention is especially useful for compact disk apparatuses such as CD, DVD, etc. which perform recording or reproducing on disk-shaped recording media, and makes it possible to provide a thin disk apparatus capable of reliably holding a disk inserted therein.

We claim:

1. A disk apparatus comprising:
a stationary frame to be a stable portion, and
a floating unit which is disposed in said stationary frame through elastic component and which performs recording and/or reproducing on a disk-shaped recording medium,
wherein said floating unit comprises a clamping member including a clamper which holds said disk-shaped recording medium, and a disk recording/reproducing-driving member including a turn table, and
a part of said clamper and a part of said turn table are fitted in each other, when said disk-shaped recording medium is held between said clamper and said turn table,
wherein a claw of a clamper-holding part is engaged with a hook portion of said clamper near the internal position of the center hole of said disk-shaped recording medium held between said clamper and said turn table, and
wherein the part of said clamper is fitted in an annular groove formed in a shaft portion of said turn table at its engaging position,
wherein the hook portion is formed at the center portion of said clamper, and wherein said hook portion includes a plurality of hooks formed at regular intervals on the same circumference, and a projection which is formed on the center axis of rotation of said disk-shaped recording medium and which comes into contact with said clamper-holding part when said disk-shaped recording medium is held between said clamper and said turn table.

2. A disk apparatus comprising:
a stationary frame to be a stable portion, and
a floating unit which is disposed in said stationary frame through elastic component and which performs recording and/or reproducing on a disk-shaped recording medium,
wherein said floating unit comprises a clamping member including a clamper which holds said disk-shaped recording medium, and a disk recording/reproducing-driving member including a turn table, and
a part of said clamper and a part of said turn table are filled in each other, when the disk-shaped recording medium is held between said clamper and said turn table,
wherein a claw of a clamper-holding part is engaged with a hook portion of said clamper near the internal position of the center hole of said disk-shaped recording medium held between said clamper and said turn table, and
wherein the part of said clamper is fitted in an annular groove formed in a shaft portion of said turn table at its engaging position, wherein said shaft portion protrudes from the turn table for fitting in the positioning hole of said disk-shaped recording medium, said annular groove of said shaft portion is formed therein at a position which corresponds to the engaging position of said claw of said clamper-holding part with said hook of said clamper; and wherein said portion of said clamper is fitted in said annular groove when said disk-shaped recording medium is held between said clamp and said turn table, wherein the hook portion is formed at the center portion of said clamper, and wherein said hook portion includes a plurality of hooks formed at regular intervals on the same circumference, and a projection which is formed on the center axis of rotation of said disk-shaped recording medium and which comes into contact with said clamper-holding part when said disk-shaped recording medium is held between said clamper and said turn table.

3. The disk apparatus as recited in claim 1, wherein said shaft portion protrudes from the turn table for fitting in the positioning hole of said disk-shaped recording medium.

4. A disk apparatus comprising:

a stationary frame to be a stable portion, and a floating unit which is disposed in said stationary frame through elastic component and which performs recording and/or reproducing on a disk-shaped recording medium, wherein said floating unit comprises a clamping member for holding said disk-shaped recording medium, and a disk recording/reproducing-driving member including a turn table, wherein the clamping member includes a clamper and a clamper-holding part, wherein the clamper includes a hook portion formed at the center portion of said clamper, said hook portion including a plurality of hooks formed at regular intervals on the same circumference, and a projection which is formed on the center axis of rotation of said disk-shaped recording medium and which comes into contact with said clamper-holding part when said disk-shaped recording medium is held between said clamper and said turn table, wherein the clamper-holding part includes a claw portion for engaging with the hook portion near the internal position of the center hole of said disk-shaped recording medium held between said clamper and said turn table, wherein the hook portion of said clamper is fitted in an annular groove formed in a shaft portion of said turn table at its engaging position when said disk-shaped recording medium is held between said clamper and said turn table, wherein said shaft portion protrudes from the turn table for fitting in the positioning hole of said disk-shaped recording medium, said annular groove of said shaft portion is formed therein at a position which corresponds to the engaging position of said claw of said clamper-holding part with said hook of said clamper.

* * * * *

UNITED STATES PATENT AND TRADEMARK OFFICE
CERTIFICATE OF CORRECTION

PATENT NO.        : 7,533,395 B2           Page 1 of 1
APPLICATION NO.   : 10/576378
DATED             : May 12, 2009
INVENTOR(S)       : Yukihiro Araki et al.

It is certified that error appears in the above-identified patent and that said Letters Patent is hereby corrected as shown below:

Column 10, Line 58, Claim 2:
"filled" should be --fitted--

Signed and Sealed this

Tenth Day of November, 2009

David J. Kappos
*Director of the United States Patent and Trademark Office*